United States Patent
Flatoy et al.

(10) Patent No.: US 11,322,741 B2
(45) Date of Patent: May 3, 2022

(54) SILICON POWDER FOR USE IN ANODES FOR LITHIUM-ION BATTERIES AND METHOD FOR PRODUCTION OF SILICON POWDER

(71) Applicant: ELKEM ASA, Oslo (NO)

(72) Inventors: Jarl Erik Morsund Flatoy, Svelgen (NO); Harry Morten Rong, Heimdal (NO); Torbjorn Roe, Trondheim (NO)

(73) Assignee: ELKEM ASA, Oslo (NO)

( * ) Notice: Subject to any disclaimer, the term of this patent is extended or adjusted under 35 U.S.C. 154(b) by 183 days.

(21) Appl. No.: 16/498,699

(22) PCT Filed: Apr. 5, 2018

(86) PCT No.: PCT/NO2018/050089
§ 371 (c)(1),
(2) Date: Sep. 27, 2019

(87) PCT Pub. No.: WO2018/186749
PCT Pub. Date: Oct. 11, 2018

(65) Prior Publication Data
US 2020/0044245 A1 Feb. 6, 2020

(30) Foreign Application Priority Data
Apr. 6, 2017 (NO) .................................. 20170577

(51) Int. Cl.
*H01B 1/04* (2006.01)
*H01M 4/00* (2006.01)
(Continued)

(52) U.S. Cl.
CPC ............. *H01M 4/386* (2013.01); *B02C 23/20* (2013.01); *C01B 33/037* (2013.01); *H01B 1/04* (2013.01);
(Continued)

(58) Field of Classification Search
CPC .......... H01B 1/04; H01M 4/386; C01B 33/02; C01B 33/021
See application file for complete search history.

(56) References Cited

U.S. PATENT DOCUMENTS 9,263,771 B2 2/2016 Fukui et al.
2009/0305129 A1 12/2009 Fukui et al.
(Continued)

FOREIGN PATENT DOCUMENTS

EP 3131140 A1 2/2017
JP 2005029410 A * 2/2005
(Continued)

OTHER PUBLICATIONS

Kormer et al "Aerosol synthesis of silicon nanoparticles with narrow size distribution-Part 1: Experimental investigations", Journal of Aerosol Science, 41 (2010) 998-1007.*
(Continued)

*Primary Examiner* — Mark Kopec
(74) *Attorney, Agent, or Firm* — Lucas & Mercanti, LLP

(57) ABSTRACT

The present invention relates to a silicon powder, where the size of the silicon powder particles are between 3 and 30 µm, a particle size fraction D10 of the silicon powder particles is between 3 and 9 µm, and where the silicon powder particles have no, or substantially no, silicon particles with a size smaller than D10 attached to the surface. The silicon powder according to the present invention is produced by wet classifying produced silicon powders.

7 Claims, 4 Drawing Sheets

(51) Int. Cl.

| | | |
|---|---|---|
| *C01B 33/02* | (2006.01) | |
| *H01M 4/38* | (2006.01) | |
| *B02C 23/20* | (2006.01) | |
| *C01B 33/037* | (2006.01) | |
| *H01M 10/0525* | (2010.01) | |
| *B03B 5/62* | (2006.01) | |
| *H01M 4/02* | (2006.01) | |

(52) U.S. Cl.
 CPC ......... *H01M 10/0525* (2013.01); *B03B 5/623* (2013.01); *C01P 2004/61* (2013.01); *C01P 2006/40* (2013.01); *H01M 2004/027* (2013.01)

(56) References Cited

U.S. PATENT DOCUMENTS

| | | |
|---|---|---|
| 2011/0177393 A1 | 7/2011 | Park et al. |
| 2014/0166939 A1 | 6/2014 | Park et al. |
| 2016/0164085 A1 | 6/2016 | Hanelt |
| 2017/0084906 A1 | 3/2017 | Hirakawa et al. |
| 2018/0212234 A1* | 7/2018 | Haufe .................. H01M 4/386 |
| 2021/0036315 A1* | 2/2021 | Put .................... H01M 10/0525 |

FOREIGN PATENT DOCUMENTS

| | | |
|---|---|---|
| KR | 1020080091501 A | 10/2008 |
| KR | 1020160137518 A1 | 11/2016 |
| WO | 2016027079 A1 | 2/2016 |

OTHER PUBLICATIONS

Examination Report dated Jan. 7, 2021 in the corresponding South Korean Application No. 10-2019-7032418 and English translation.
International Search Report and Written Opinion for Corresponding International Application No. PCT/NO2018/050089 (10 Pages) (dated Jul. 5, 2018).
International Preliminary Report on Patentability for Corresponding International Application No. PCT/NO2018/050089 (15 Pages) (dated Jun. 3, 2018).

\* cited by examiner

Wet Classification – Start up

Wet Classification – While Classifying

Wet Classification – After Fines Removal

Dry Classification

SILICON POWDER FOR USE IN ANODES FOR LITHIUM-ION BATTERIES AND METHOD FOR PRODUCTION OF SILICON POWDER

CROSS REFERENCE TO RELATED APPLICATION

This Application is a 371 of PCT/NO2018/050089 filed on Apr. 5, 2018 which, in turn, claimed the priority of Norwegian Patent Application No. 20170577 filed on Apr. 6, 2017, both applications are incorporated herein by reference.

TECHNICAL FIELD

The present invention relates to silicon powder for use in anodes for lithium-ion batteries and a method for the manufacturing of such silicon powder.

BACKGROUND ART

In line with rapid increase in use of fossil fuels, the demand for use of alternative energy or clean energy is increasing. Thus, the field of power generation and electricity storage, which use electrochemical reaction, is most actively studied.

The demand for secondary batteries as energy sources is rapidly growing. Among the secondary batteries, research on lithium secondary batteries having high energy density, high operating voltage, long cycle lifespan and low self-discharge rate has been underway and such lithium secondary batteries are commercially available and widely used.

A Li-ion battery cell generally comprises a copper current collector for the anode and an aluminum current collector for the cathode, which are externally connectable to a load or to a recharging source as appropriate. It should be noted that the terms "anode" and "cathode" are used in the present specification as those terms are understood in the context of batteries placed across a load, i.e. the term "anode" denotes the negative pole and the term "cathode" the positive pole of the battery. A graphite-based composite anode layer overlays the copper current collector and a lithium containing metal oxide-based composite cathode layer overlays the aluminum current collector. A porous separator is provided between the graphite-based composite anode layer and the lithium containing metal oxide-based composite cathode layer: a liquid electrolyte material is dispersed within the porous spacer or separator, the composite anode layer and the composite cathode layer. In some cases, the porous spacer or separator may be replaced by a polymer electrolyte material and in such cases the polymer electrolyte material is present within both the composite anode layer and the composite cathode layer.

In a modern Li-ion battery, the industry standard is to use a negative electrode made of graphite. Charging and discharging processes are performed while lithium ions of a cathode are repeatedly intercalated into and de-intercalated from an anode. Standard graphite electrodes have a specific capacity of about 300 mAh/g, with the best commercially available materials coming up to 440 mAh/g. Although there are differences in theoretical capacities of batteries according to kinds of electrode active materials, in most cases, charge and discharge capacities are deteriorated as cycles proceed.

Silicon has received attention as an anode material for high energy density batteries. Silicon has a theoretical capacity greater than 4000 mAh/$g_{Si}$, but with the current technology available for the opposite, positive, electrode, there is little incentive to go beyond 1000 mAh/$g_{tot}$. Here the "$g_{Si}$" refers to the silicon fraction of the electrode and "$g_{tot}$" refers to the total of silicon, carbon and binder of a composite anode. In both carbon and silicon anodes, the anode material is particulate and the particulate mass is held together by a binder. However, silicon suffers from significant volume changes, as high as 400%, during the lithiation and de-lithiating reactions. This volume change is much larger than the volume change in carbon anodes. Because of the large volume change, it has proved difficult to find a binder system for silicon anodes than for carbon anodes. The teachings of binders for carbon anodes are not transferrable to silicon anodes. The repeated expansion and contraction on cycling will cause degradation and/or cracking of the silicon anode material. This can destroy the electrode integrity via electrical isolation between particles and current collector so that silicon performance is greatly compromised and exhibits very poor cycle life. Cyclability is the primary requirement for a negative battery electrode. Depending on markets, the target would be from 1.000 cycles for consumer electronics (CE) to >2.000 cycles for electric vehicles (EV) or >10.000 for grid balancing (Grid).

US 2014/0166939 (A) and US 2011/0177393 (A) relates to composite materials for battery electrodes. The composite material includes greater than 0% and less than about 90% by weight of silicon particles. In US 2011/0177393 (A) the silicon average or median largest dimension is between 10 nm to 40 µm and in US 2014/0166939 (A) the silicon particles have an average particle size between about 0.1 µm and about 30 µm and a surface including nanometer-sized features. From FIG. 22 in US 2014/0166939 (A) showing a SEM micrograph of the silicon particles it can be seen that there are many small silicon particles adhering to the surface of larger sized silicon particles. Further, from FIG. 27A showing particle size distribution for one source of silicon particles it can be seen that the silicon particles have a high content of very small undersized particles with a size below 1 µm. On the other hand, FIG. 27B in US 2014/0166939 (A) shows silicon particle distribution with a high number of particles above 10 µm.

U.S. Pat. No. 9,263,771 discloses a lithium secondary battery where the anode active material consists of silicon particles having an average particle size from 7 to 25 µm where the silicon particles have a particle size distribution of which D10 is 5 µm or greater and D90 is 23 µm or less where the silicon particles are polycrystalline silicon particles. It is further disclosed in U.S. Pat. No. 9,263,771 that it is desirable that the silicon particles are prepared by pulverizing an ingot of silicon that is prepared by thermally decomposing or thermally reducing a material containing a silane compound and classifying the pulverized material. It is however not stated how the classifying is carried out. Normally classifying of pulverized silicon particles is carried out by dry classifying methods.

It has surprisingly been found that silicon powders for use in anode for lithium-ion batteries should have as few undersized particles as possible. By the term "undersized" used herein it is referred to particles having a particle size smaller than the aimed D10 size of the silicon powder particle size distribution. It was also found that the silicon particles should have few or substantially no small particles attached to the surface of the larger particles.

Thus, the object of the present invention is to provide a silicon powder especially suitable for use in anodes for Li-ion batteries, where the silicon powder has no, or substantially no, undersized silicon particles attached to the surface of the silicon particles.

Another object of the present invention is to provide a silicon powder having a well-defined particle size distribution such that there are no, or substantially no, particles having a size smaller than the aimed D10 attached to the surface of the silicon particles. Another object of the present invention is to provide a method for the manufacturing of the silicon powder for use in anodes for Li-ion batteries, the silicon powder having no, or substantially no, undersized silicon particles attached to the surface of the silicon particles

SUMMARY OF THE INVENTION

The present invention thus relates to a silicon powder especially suitable for use in anodes for lithium-ion batteries, where the size of the silicon powder particles are between 3 and 30 μm, a particle size fraction D10 of the silicon powder particles is between 3 and 9 μm, and where the silicon powder particles have no, or substantially no, silicon particles having a size smaller than D10 attached to the surface.

In an embodiment the silicon powder particles have a particle size distribution where D10 is between 3 and 9 μm, D50 is between 7 and 16 μm and D90 is between 14 and 25 μm.

The silicon powder is preferably produced by milling coarse silicon particles. Advantageously the milling is performed by using jet mill. The jet milling is performed in a conventional jet mill, preferably to a particle size where D99 is less than 30 μm. The jet milled silicon powder particles are then subjected to wet classification. Throughout this description, jet milling is described for the process of milling coarse silicon particles. It should however be appreciated that other grinding techniques may be used for milling coarse silicon particles.

In an embodiment the silicon powder according to the present invention has a particle size distribution where D10 is between 5 and 7 μm, D50 is between 8 and 10 μm and D90 is between 15 and 22 μm.

The present invention further relates to a method for producing silicon powder according to the present invention, especially suitable for use in anodes for lithium-ion batteries, wherein coarse silicon particles are jet milled and thereafter subjected to wet classification to remove silicon particles having a particle size below the lower cut-off particle size, to obtain silicon powder particles with a particle size between 3 to 30 μm.

In an embodiment of the method a silicon powder with a particle size distribution where D10 is between 3 and 9 μm, D50 is between 7 and 16 μm and D90 is between 14 and 25 μm is obtained.

Preferably the silicon particles are jet milled to a particle size of D99 less than 30 μm.

In an embodiment of the method of the present invention the silicon powder particles are subjected to wet classification to obtain silicon powder particles with a particle size distribution where D10 is between 5 and 7 μm, D50 is between 8 and 10 μm and D90 is between 15 and 22 μm.

It has surprisingly been found that by subjecting jet milled silicon powder particles to wet classification, the amount of undersized particles (volume of particles having size below D10) are substantially reduced and that the silicon particles have substantially no undersized particles attached to the surface compared to silicon powder particles having been subjected to dry classification.

It has been found that silicon powder particles according to the invention, having substantially no undersized particles attached to the surface, provide better performance when used in anodes in lithium-ion batteries. It is believed that the reason why the silicon powder particles according to the invention provide better performance in lithium-ion batteries is as follows: Silicon particles for use as anode material in lithium-ion batteries are coated with carbon or with other materials before being mixed with other anode materials. It is important that the coating is homogeneous on all silicon particles. If the silicon particles have many small silicon particles attached to their surfaces, the carbon coating may be broken as the smaller silicon particles break away from the surfaces of the silicon particles during the coating process or in later treatments or handling. This results in that the carbon coating will not be homogeneous on the silicon particles. For the silicon powder particles according to the invention having no or substantially no small particles attached to the surface, the carbon coating on the silicon particles will be predominantly homogeneous and result in better performance in Lithium-ion batteries.

DETAILED DESCRIPTION OF THE INVENTION

The silicon powder according to present invention is a particulate material, consisting to essentially of single particles. Thus, the silicon powder particles are not present as aggregates of particles.

The silicon used for preparing the silicon powder particles of the present invention is preferably a metallurgical produced silicon. Table 1 gives examples of metallurgical produced silicon types which may be used in the production of the silicon powder according to the present invention. However, also silicon produced by thermal decomposition of silane, such as by the Siemens process, by the fluidized bed reactor (FBR) process and Free space reactor can be used as well.

Metallurgical silicon is manufactured by firstly extract silicon from quartz rock, which consists of silicon and oxygen. It is extracted in a chemical process at high temperatures in which the oxygen in the quartz is bound to carbon, thus freeing the silicon from the oxygen. A smelting furnace is fed with quartz and various types of carbonaceous reduction materials such as coke, coal, charcoal and wood chips. Carbonaceous electrodes are lowered into this mixture, and an electric arc is formed between the electrodes to provide high temperatures in the smelting furnace. This causes the oxygen in the quartz to react with the carbon in the carbonaceous material and form molten silicon and CO gas. The CO gas rises and the molten silicon is tapped from the furnace. The thus produced metallurgical silicon may contain different levels of Fe, Al, Ti, Ca as well as other impurities.

One particular grade of metallurgical silicon, produced by Elkem AS and sold under the trademark Silgrain®, is manufactured by leaching lumps of 90-94% FeSi in a hot acidic solution of ferric chloride and hydrochloric acid. In the Silgrain® process the acid dissolves the impurities, mainly Fe, Al and Ca, breaking apart the lumps and leading to a granulated product of high purity silicon. One feature that characterizes the Silgrain® process and distinguishes it from other hydrometallurgical leaching processes is the rapid disintegration of FeSi into small grains during the reactions. Table 1 shows some examples of different grades of metallurgical silicon produced by Elkem AS. The chemical analysis gives the typical composition of the silicon material.

TABLE 1

Metallurgical produced silicon materials, produced by Elkem AS.

| Si-type | Si wt % | Fe wt % | Al wt % | Ca wt % | Ti wt % | P ppmw | B ppmv | Particle Size, μm |
|---|---|---|---|---|---|---|---|---|
| Silicon 99 | 99.0 | 0.30-0.50 | | Max. 0.03 | 200-300** | 10-20 | | |
| Silgrain ® silicon | 99.4 | 0.22 | 0.26 | 0.035 | 0.020 | 25 | 30 | 45-500 |
| Silgrain ® HQ | 99.8 | 0.04 | 0.09 | 0.013 | 0.001 | 25 | 30 | 200-800 |

Silgrain ® is a trademark belonging to Elkem AS and is used for a range of silicon materials produced by the Silgrain ® process
**ppmw High purity polysilicon is produced by other methods, the best known technique is the Siemens process. The Siemens technique grows high-purity silicon crystallites directly on the surface of high purity silicon seed rods by chemical decomposition of gaseous trichlorosilane blown over the rod's surface at 1150° C. While the conventional Siemens process produces electronic grade polysilicon at typically 9N-11N purity, that is, it contains impurity levels of less than one part per billion (ppb), the modified Siemens process is a dedicated process-route for the production of solar grade silicon (SoG-Si) with purities of 6N (99.9999%) and less energy demand.

A more recent alternative for the production of polysilicon is the fluidized bed reactor (FBR) manufacturing technology. Compared to the traditional Siemens process, FBR features a number of advantages that lead to cheaper polysilicon demanded by the fast-growing photovoltaic industry. Contrary to Siemens' batch process, FBR runs continuously, wasting fewer resources and requires less setup and downtime. It uses about 10 percent of the electricity consumed by a conventional rod reactor in the established Siemens process, as it does not waste energy by placing heated gas and silicon in contact with cold surfaces. In the FBR, silane ($SiH_4$) is injected into the reactor from below and forms a fluidized bed together with the silicon seed particles that are fed from above. The gaseous silane then decomposes and deposits silicon on the seed particles. When the particles have grown to larger granules, they eventually sink to the bottom of the reactor where they are continuously withdrawn from the process. The FBR manufacturing technology outputs polysilicon at 6N to 9N.

Comparing the energy consumption during the production of metallurgical silicon with polysilicon produced by the Siemens method, it is clear that the metallurgical route only uses a quarter of the energy. The main reason that the metallurgical method only requires a fraction of the energy is that the silicon is purified without converting it to a gaseous state and then back to silicon, which are the steps used in the traditional production.

BRIEF DESCRIPTION OF THE DRAWINGS

Embodiments of the invention will now be described with reference to the following drawings, wherein

As shown in FIG. 5a, b, c the wet classification apparatus comprises a tank 1 with a conical lower part 2. The lower part 2 has in its bottom a supply pipe 3 for water and a second pipe 4 for removal of water and coarse silicon particles according to the present invention. The supply pipe 3 for water and the pipe 4 for removal of water and coarse silicon particles according to the invention, have valves (not shown) for closing and opening of the pipes 3 and 4. At its upper end the tank 1 has supply means 5 for jet milled silicon particles and a pipe 6 for removal of undersized (fine) silicon particles.

As shown in FIG. 5a, at start-up of the wet classification of silicon particles, jet milled silicon is supplied to the upper end of the tank 1 through supply means 5. The valve in the pipe 4 for removal of water and coarse silicon particles from the tank 1 is closed. Water is supplied to the tank through the supply pipe 3 for water.

FIG. 6 shows a schematic view of a standard dry classification apparatus and process. A rotating sieve 10 is supplied with jet milled silicon particles by injecting the silicon particles into a stream of nitrogen gas in a pipe 11. Supplemental nitrogen gas is supplied to the sieve 10 through two pipes 12. Undersized silicon particles (fine silicon particles) are removed from the upper end of the sieve 1 through a pipe 13 and into a filter 14. Coarse silicon particles are removed from the bottom of the sieve through a pipe 15.

EXAMPLES

Example 1

Figure 5A:
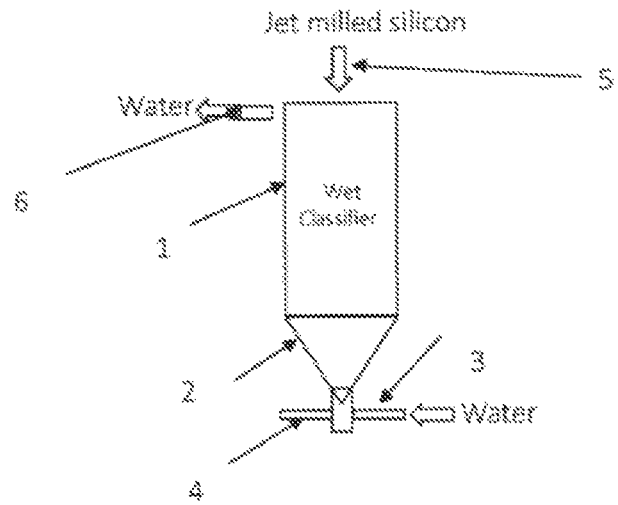
FIG. 5a, b, c shows a schematic drawing of the wet classification apparatus and process.
Figure 5B:
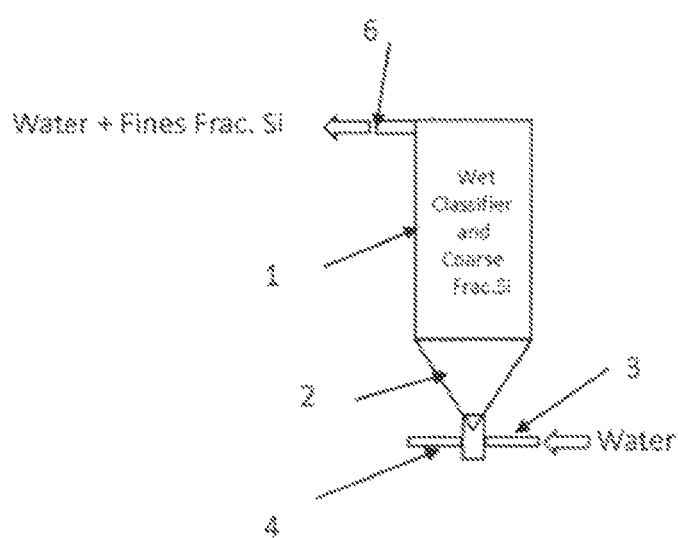
As shown in FIG. 5b showing wet classification during classifying, water is continuously supplied through the water supply pipe 3 and water and undersized silicon particles (fines) are continuously removed from the tank 1. When all undersized silicon particles have been removed, the supply of water through the water supply pipe 3 is stopped by closing the valve in the pipe 3. Then, as shown in FIG. 5c, the remaining water in the tank together with the coarse silicon particles according to the present invention is removed from the tank 1 by opening the valve in the pipe 4. The water and coarse silicon particles are forwarded to the drying apparatus 7 for drying of the silicon powder particles according to the present invention.
Figure 5C:
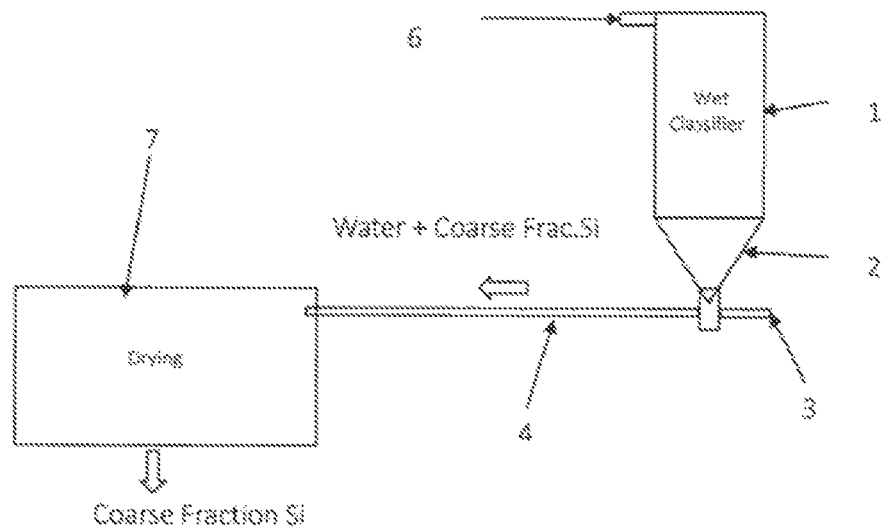
As shown in FIG. 5c the apparatus further comprises a drying apparatus 7 for the coarse silicon particles according to the present invention.

Silgrain® silicon produced by Elkem AS was jet milled to a particle size of D99 less than 30 µm. The jet milled material was added to a tank, and subjected to wet classification in the apparatus shown in FIGS. 5a, b and c. Water at about ambient temperature was supplied to the bottom of the tank until all fines was removed, thus obtaining a powder having a lower cut-off particle size of about 5-7 µm. The remaining material in the tank was supplied into a settling tank, and thereafter dried. The chemical analysis of the Silgrain® silicon is shown in Table 2.

TABLE 2

| Elements | % |
|---|---|
| % Si | 99.797 |
| % Fe | 0.023 |
| % Al | 0.071 |
| % Ca | 0.007 |
| % Ti | 0.002 |

The particle size distribution was measured by laser diffraction analysis using Malvern Mastersizer 2000 with dry cell Scirocco 2000. Optical model: Mie theory calculation model with Si refractive index=3.5 and absorption 0.1. Si density=1.0 g/cm3. The results are shown in FIG. 1.

Figure 1:
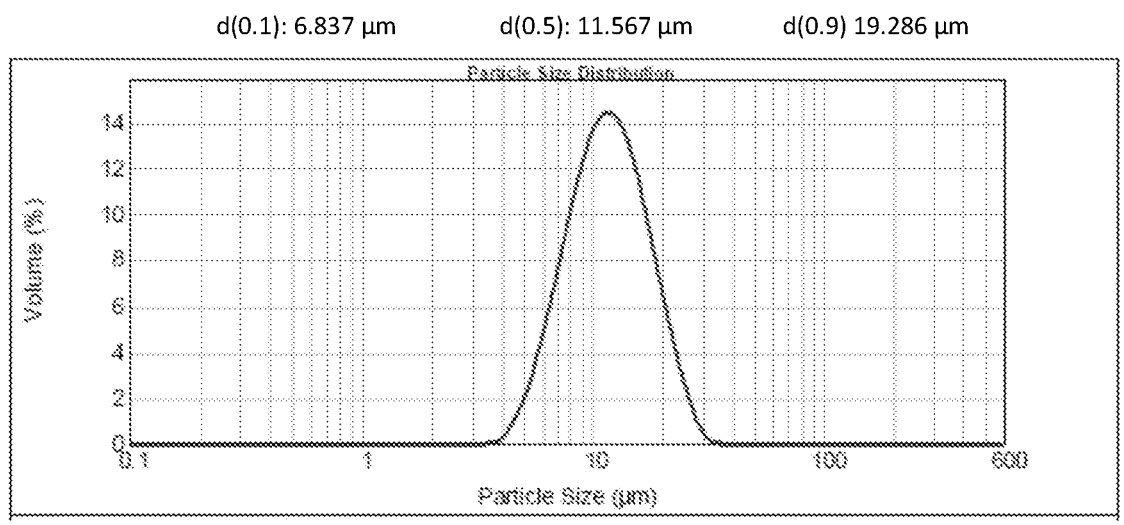
FIG. 1 shows the particle size distribution for silicon powder particles that have been subjected to wet classification according to the invention.
Figure 3:
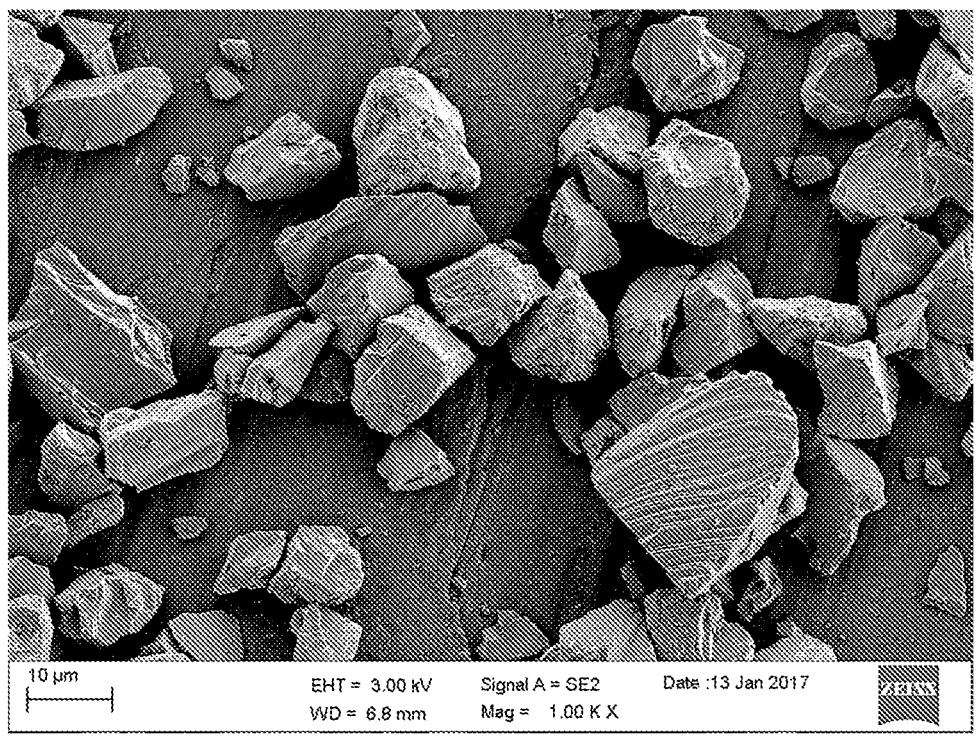
FIG. 3 shows SEM micrographs of wet classified silicon particles.

As can be seen from FIG. 1 there are literally no particles smaller than 3 µm. D10 is about 6.8 µm, D50 is about 11.5 µm and D90 is about 19.3 µm. FIG. 3 is a SEM microphotograph of the particles produced by wet classification. It can be seen that the individual silicon particles are very clean with substantially no small particles attached to the surface of the silicon particles.

The silicon powder particles produced according to Example 1 have shown very good results when used in anodes for lithium-ion batteries.

Example 2 (Comparison)

Figure 6:
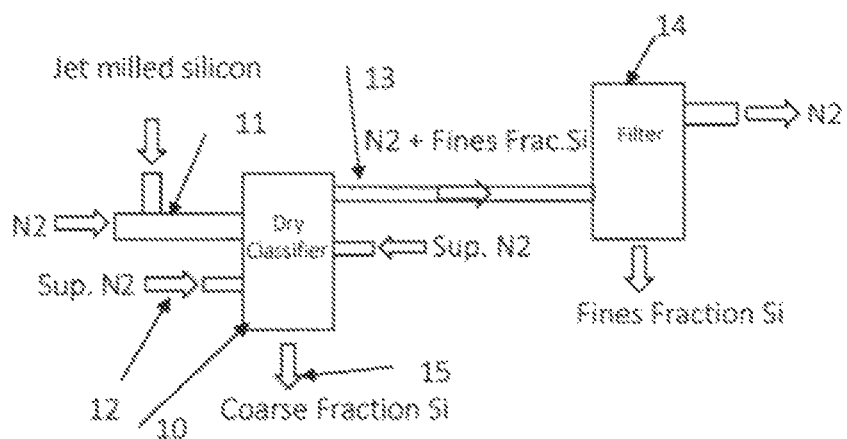
FIG. 6 shows a schematic drawing of the dry classification apparatus and process.

The same Silgrain® silicon as used in Example 1 was jet milled to a particle size of D99 less than 30 µm and subjected to dry classification using the apparatus shown in FIG. 6. The particle size distribution was measured by laser diffraction analysis using Malvern Mastersizer 2000 with dry cell Scirocco 2000, using the same optical model as specified in Example 1. The results are shown in FIG. 2.

Figure 2:
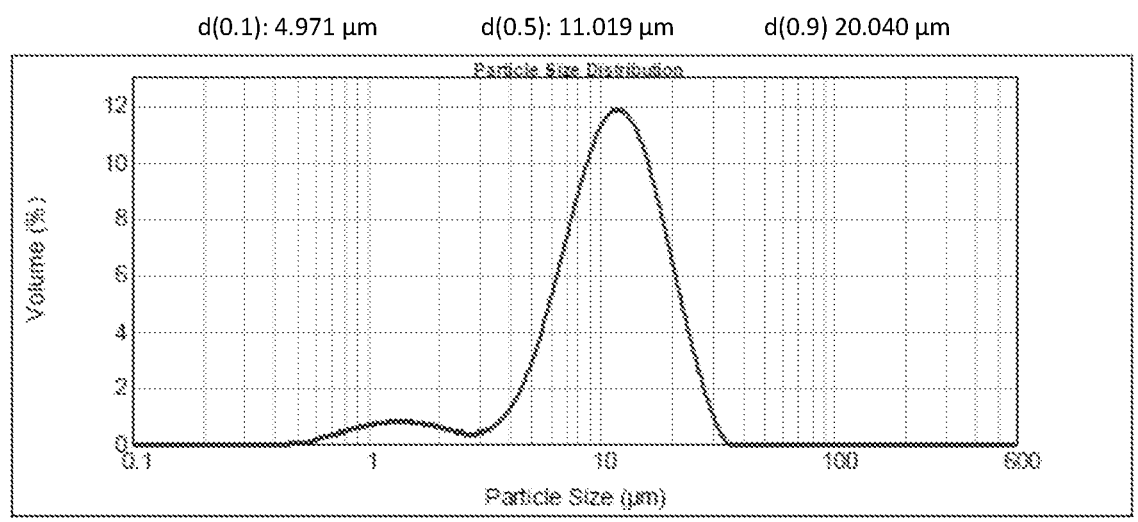
FIG. 2 shows the particle size distribution for silicon powder particles having been subjected to dry classification.
Figure 4:
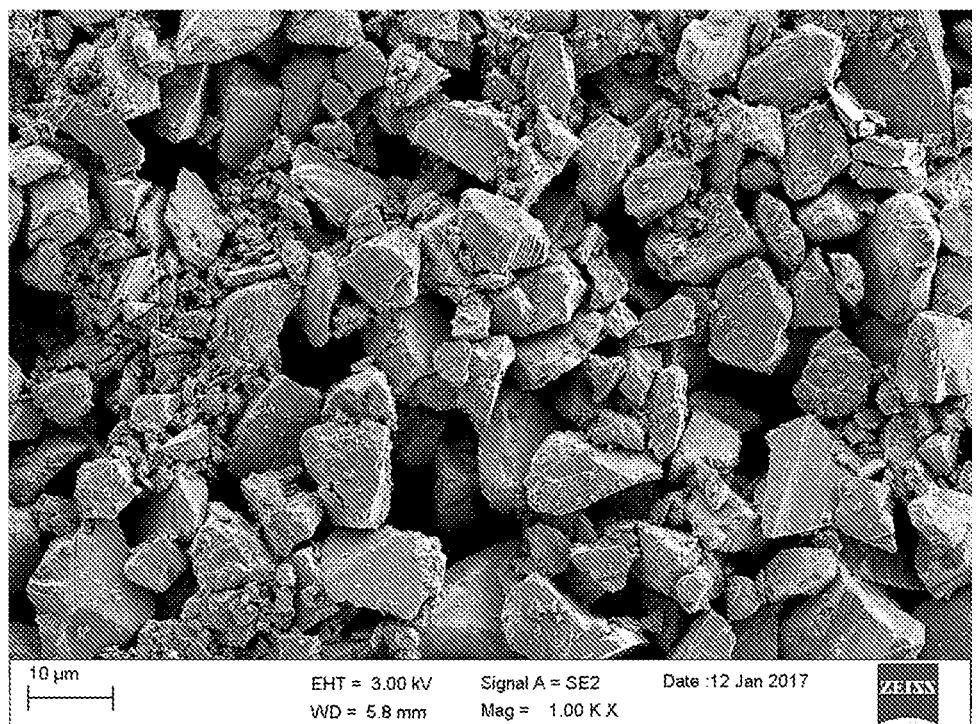
FIG. 4 shows SEM micrographs of dry classified silicon particles.

As can be seen from FIG. 2 there is a fairly high volume of particles with a particle size less than 3 µm. D10 is about 5.0 µm, D50 is about 11 µm and D90 is about 20 µm. The main difference between the particle size distribution of the wet classified particles of Example 1 and the dry classified particles of this Example 2 is the volume of particles below about 3 µm. FIG. 4 is a SEM microphotograph of the particles produced by dry classification. It can be seen that the individual silicon particles have many small particles attached to the surface of the silicon particles. The small particles attached to the surface of the larger particles have been observed to reduce the efficiency of silicon containing anodes in lithium-ion batteries.

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:

1. Silicon powder especially suitable for use in anodes for lithium-ion batteries, where the size of the silicon powder particles are between 3 and 30 µm, a particle size fraction D10 of the silicon powder particles is between 3 and 9 µm, a D50 between 7 and 16 µm and a D90 between 14 and 25 µm, wherein the silicon powder particles have no silicon particles having a size smaller than D10 attached to the surface, and wherein the silicon powder particles comprises a homogeneous carbon coating.

2. Silicon powder according to claim 1, wherein the size of the silicon powder particles is between 5 and 22 µm, and a particle size distribution where D10 is between 5-7 µm, D50 is between 8 and 10 µm and D90 is between 15 and 22 µm.

3. Silicon powder according to claim 1, wherein the silicon is a metallurgically produced silicon.

4. Silicon powder according to claim 1, wherein the silicon powder is produced by milling coarse silicon particles, followed by wet classification.

5. A method for producing the silicon powder according to claim 1, the method comprising milling coarse silicon particles to a D99 of less than 30 microns, and thereafter wet classifying the resulting silicon powder particles to remove silicon particles having a particle size below the lower cut-off particle size.

6. A method according to claim 5, wherein the size of the obtained silicon powder particles is between 5 to 22 µm, and the silicon powder has a particle size distribution were D10 is between 5 and 7 µm, D50 is between 8 and 10 µm and D90 is between 15 and 22 µm.

7. A negative electrode in a Li-ion battery comprising the silicon powder according to claim 1 as an active material.

* * * * *